Sept. 11, 1962 R. R. ZINDLER 3,053,345
SELF-ADJUSTING DISC BRAKE
Original Filed Sept. 16, 1959 7 Sheets-Sheet 1
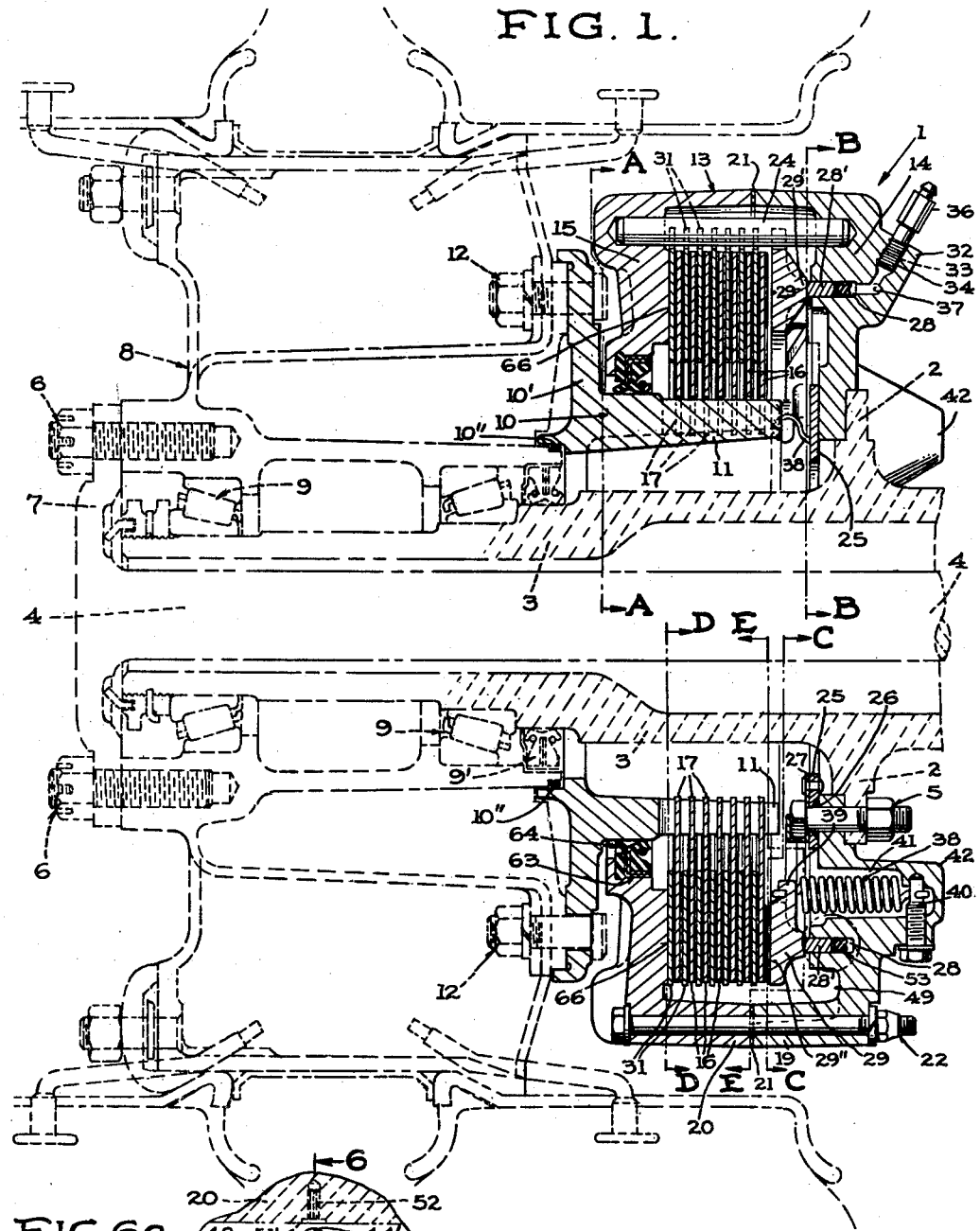
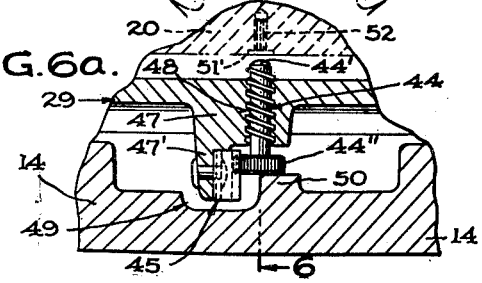
INVENTOR
ROGER R. ZINDLER Sept. 11, 1962 R. R. ZINDLER 3,053,345
SELF-ADJUSTING DISC BRAKE
Original Filed Sept. 16, 1959 7 Sheets-Sheet 2
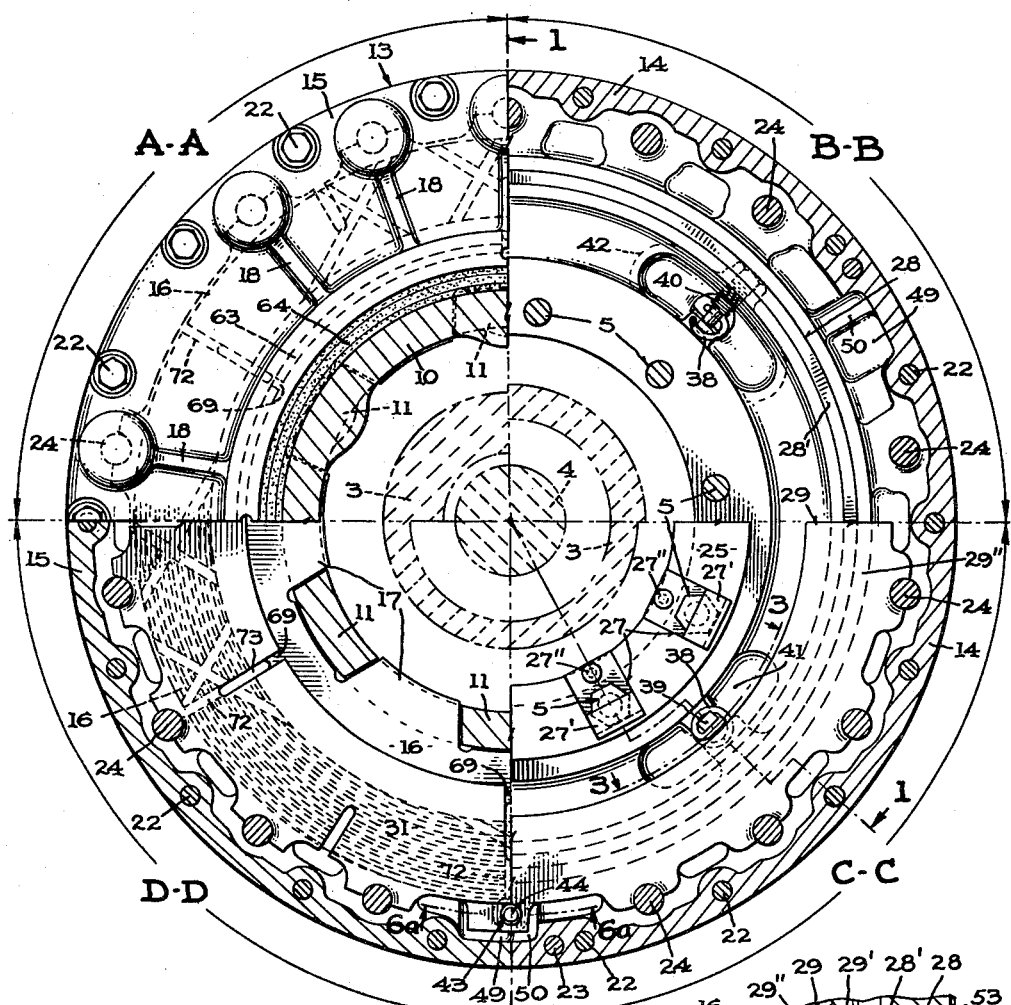
INVENTOR
ROGER R. ZINDLER
BY
ATTORNEYS

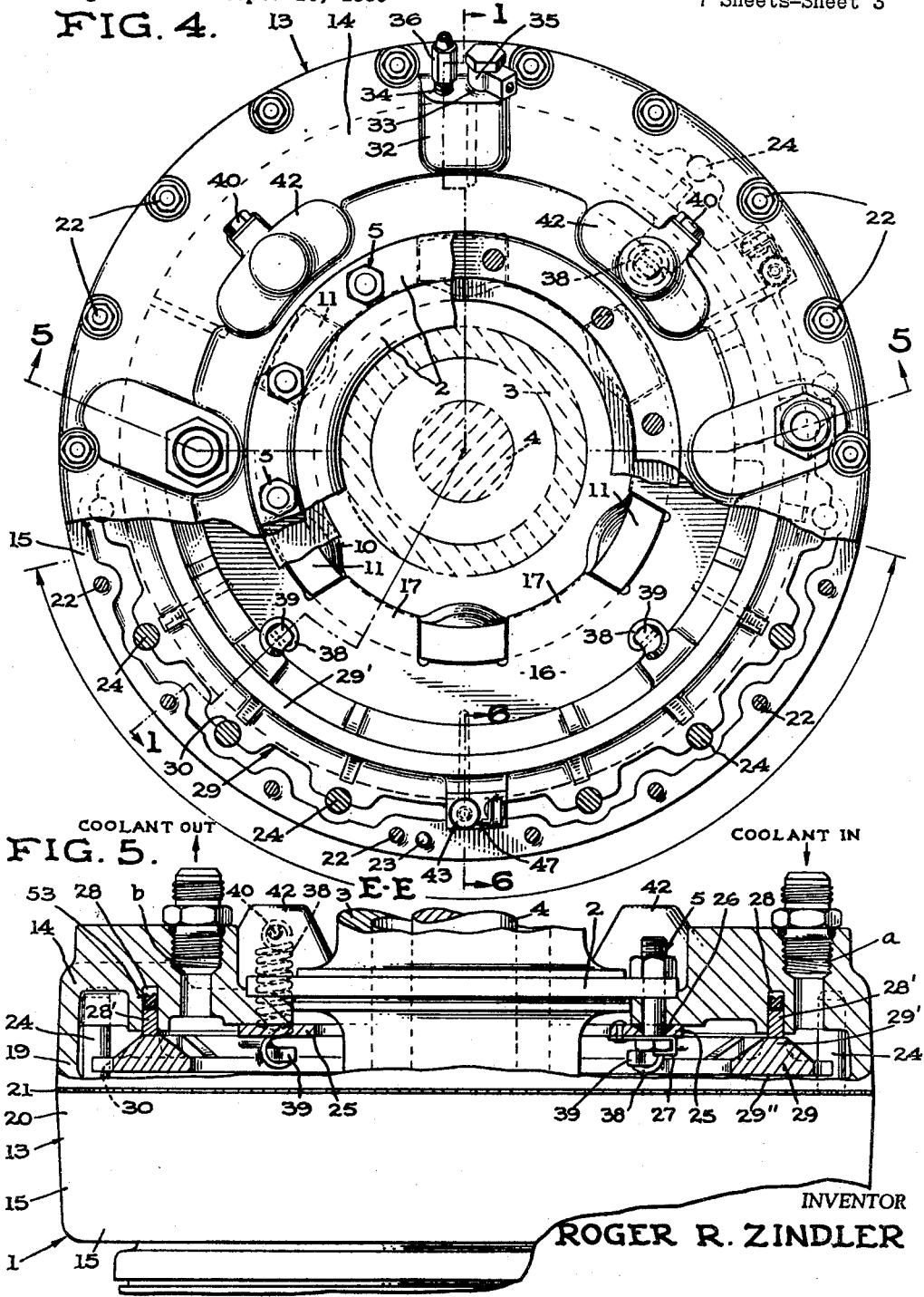

Sept. 11, 1962 R. R. ZINDLER 3,053,345
SELF-ADJUSTING DISC BRAKE
Original Filed Sept. 16, 1959 7 Sheets-Sheet 4
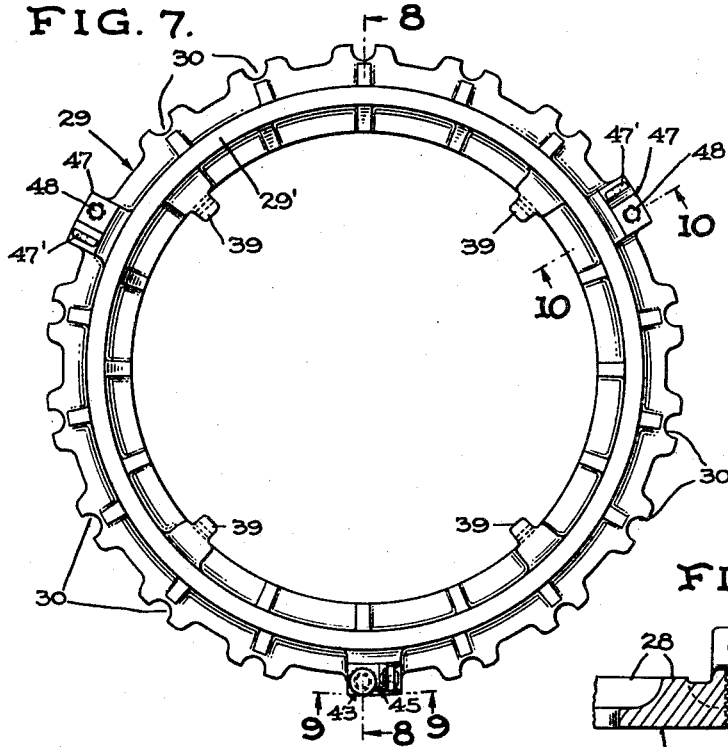
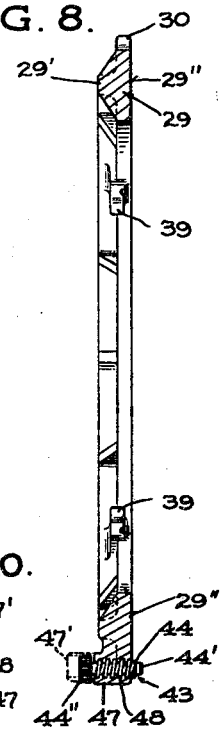
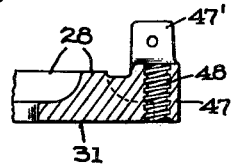
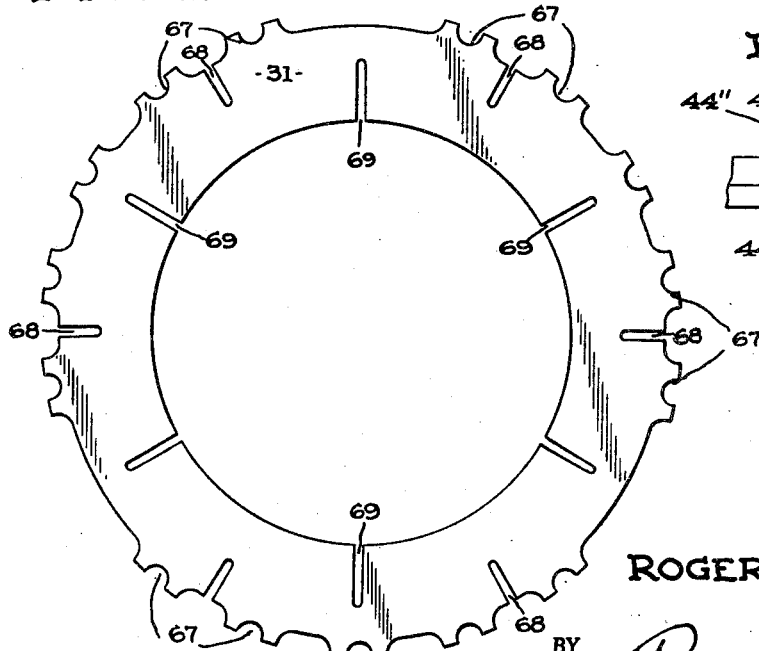
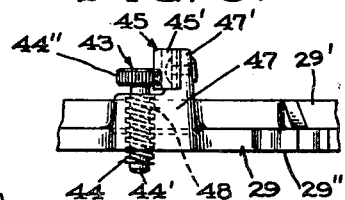
INVENTOR
ROGER R. ZINDLER
BY
ATTORNEYS

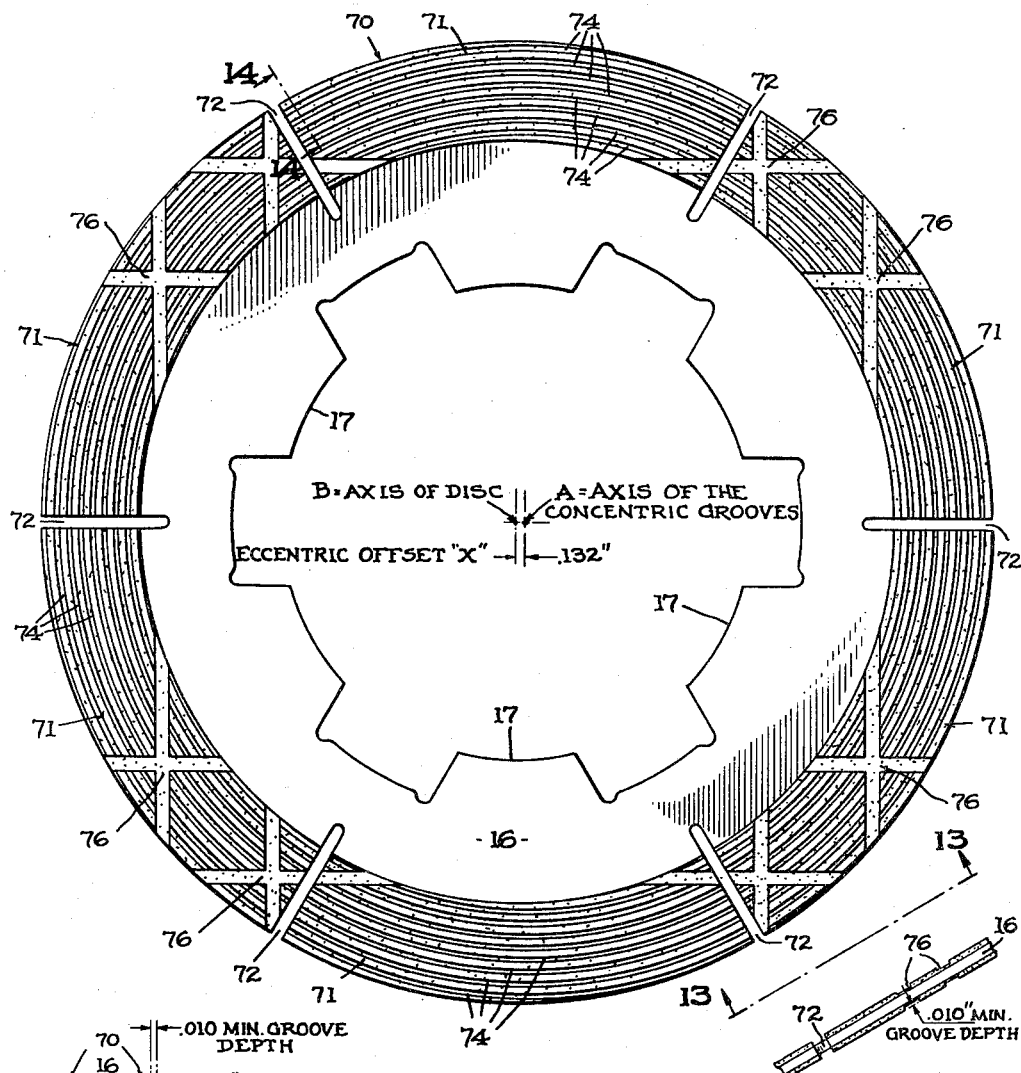

Sept. 11, 1962 R. R. ZINDLER 3,053,345
SELF-ADJUSTING DISC BRAKE
Original Filed Sept. 16, 1959 7 Sheets-Sheet 6
FIG. 15.
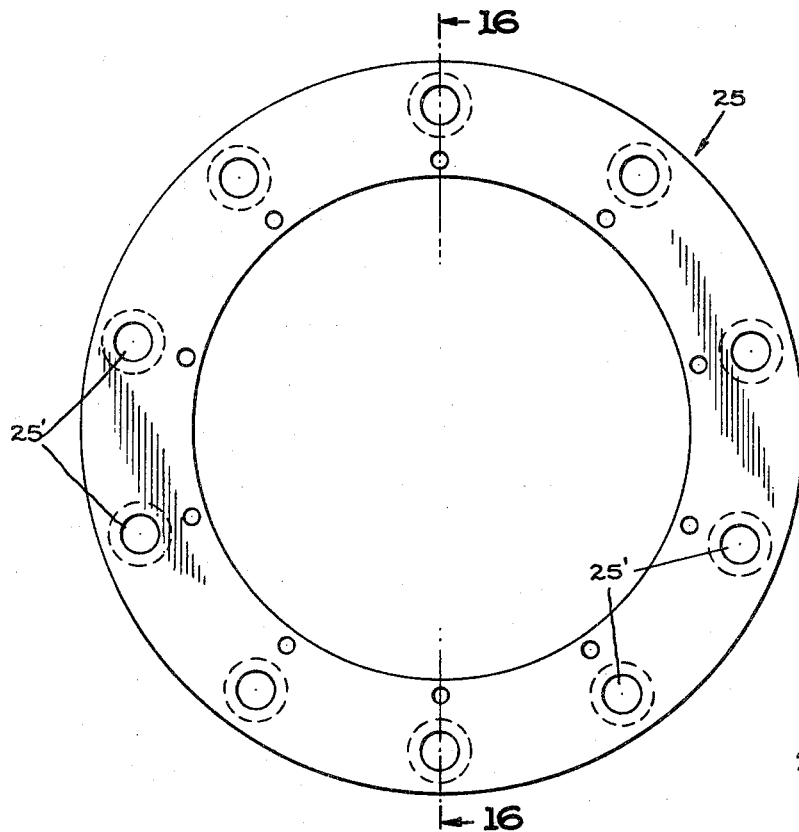
FIG. 16
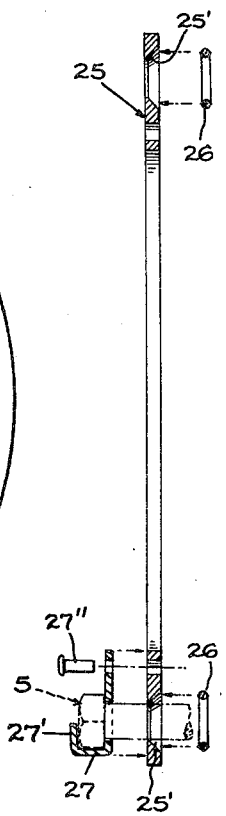
FIG. 17.
FIG. 18.
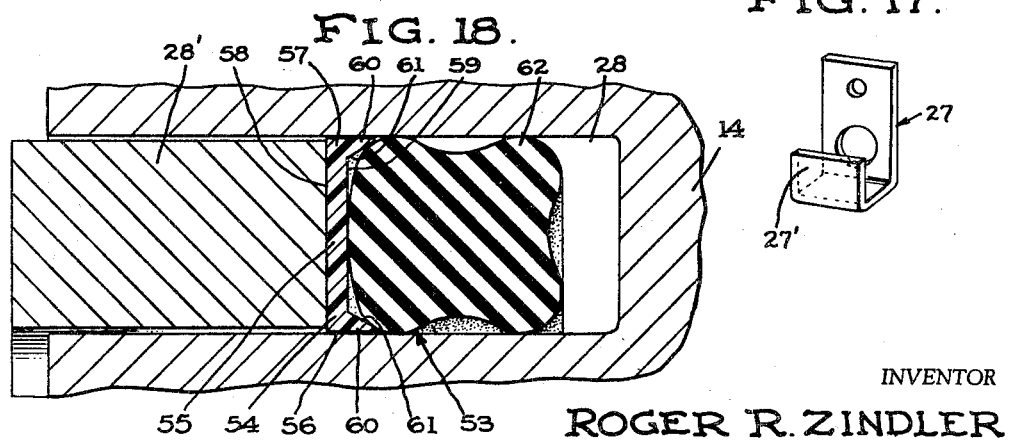
INVENTOR
ROGER R. ZINDLER
BY *Robb & Robb*
ATTORNEYS Sept. 11, 1962  R. R. ZINDLER  3,053,345
SELF-ADJUSTING DISC BRAKE
Original Filed Sept. 16, 1959  7 Sheets-Sheet 7

INVENTOR
ROGER R. ZINDLER
BY *Robert Cobb*
ATTORNEYS

United States Patent Office 3,053,345
Patented Sept. 11, 1962

3,053,345
SELF-ADJUSTING DISC BRAKE
Roger R. Zindler, St. Joseph, Mich., assignor to Lambert Brake Corporation, St. Joseph, Mich., a corporation of Michigan
Original application Sept. 16, 1959, Ser. No. 840,458. Divided and this application June 1, 1960, Ser. No. 33,307
3 Claims. (Cl. 188—72)

This application is a division of application Serial Number 840,458, filed September 16, 1959.

The present invention relates to friction devices, and more particularly to fluid-pressure-operated multiple disc brakes which are preferably applicable to heavy-duty service such as encountered in various kinds of heavy earth-working machinery and equipment, tractor and/or trailer type vehicles, various kinds of freight and passenger carrying vehicles, including trucks and busses, as well as in the operation of heavy industrial machinery, wherein the heavy loads involved in each classification require the use of heavy duty brakes that are efficiently capable of withstanding continual and/or severe service conditions.

This invention further relates to disc-type fluid-pressure-operated heavy duty retarder-brakes of the liquid-cooled type which lend themselves to efficiently and effectively performing the dual function of retarding and/or normal service braking of the heavy loads encountered in the various aforementioned heavy service classifications.

Among the disadvantages of many current allegedly heavy duty brake constructions is the unsatisfactory design of the friction disc components from the standpoint of achieving optimum cooling which, in turn, results in the inability to effectively dissipate the high heat generated therein by repeated or severe brake applications. Consequently, these current brakes fail in their purpose to provide a rugged-enough brake assembly which can effectively serve and withstand the dual function of a retarder and a service brake without requiring frequent and undue replacement of the components. The attendant relatively short life of such brakes makes them unsatisfactory for the desired use.

A primary object of this invention, therefore, is to provide a fluid-pressure-operated and liquid-cooled disc type brake of extremely rugged construction that overcomes the foregoing disadvantages, and which embodies a novel friction disc construction, and, together with improved results attained thereby, minimizes wear and considerably increases the life and effectiveness of the brake.

Another primary object of this invention is to provide an improved heavy duty self-adjusting brake of the multiple disc type that utilizes a combined pneumatic or hydraulic fluid-operated and a hydraulic fluid-cooled construction wherein the extreme heat generated by repeated or severe brake applications is effectively dissipated and reduced to a minimum.

A further object of this invention is to provide an improved brake of this class which is relatively simple, compact and yet sturdy enough to perform the dual function of an effective and efficient retarder, as well as a heavy duty service brake, and which, accordingly, affords more effective deceleration of heavy loads without the aid of expensive or cumbersome transmission type retarders.

Yet another object is to provide an improved retarder-brake of this class which may be operated by either pneumatic or hydraulic fluid pressure and which is characterized by ease of installation, service and replacement as a relatively lightweight but heavy duty, compact unitary assembly which is intended to replace the more expensive, heavier and cumbersome transmission retarders currently being used on large commercial vehicles.

Other and further objects and advantages will be hereinafter set forth and will become apparent to those skilled in the art from the following detailed description, and the novel features thereof will be defined in the appended claims.

In the drawings:

FIG. 1 is a vertical cross-sectional view through a typical heavy duty brake constructed in accordance with this invention, as shown in the non-applied condition and as seen substantially on line 1—1 of FIGS. 1 and 4, and is illustrative of the invention as applied to a typical dual rear or other driven axle and wheel mounting shown in broken outline;

FIG. 2 is a composite sectional and elevational view of the brake as seen from the outboard side of the brake assembly, and showing four sectors or quadrants respectively designated as A—A, B—B, C—C and D—D, and as viewed substantially on the respective correspondingly designated section lines of FIG. 1;

FIG. 3 is a fragmentary cross-sectional view as seen on line 3—3 of FIG. 2, showing a return spring as assembled between the primary actuator disc and the recess within the inboard housing member;

FIG. 4 is a composite sectional and elevational view as viewed from the inboard side of the brake, with the generally upper half-sector seen in elevation with a portion of the axle mounting flange broken away, and with the lower sector E—E representing a cross-section taken substantially on line E—E of FIG. 1;

FIG. 5 is a view partly in elevation and partly in cross-section as taken substantially on line 5—5 of FIG. 4, and more clearly showing the coolant inlet and outlet ports;

FIG. 6 is a fragmentary cross-sectional view through the brake assembly as taken substantially on line 6—6 of FIGS. 4 and 6a, showing more clearly the self-adjuster means in relationship to the other components;

FIG. 6a is a fragmentary cross-sectional view through the automatic adjuster means of the brake assembly as taken substantially on line 6a—6a of FIG. 2;

FIG. 7 is an elevational view on a slightly smaller scale of one illustrative form of actuator disc as used in the brake assembly of this invention, and showing one of the automatic adjuster means assembled therewith at the lowermost portion;

FIG. 8 is a cross-sectional detail view of the actuator disc as taken substantially on line 8—8 of FIG. 7;

FIG. 9 is a fragmentary side elevational detail view of the self-adjuster means as assembled in the actuator disc and as viewed on line 9—9 of FIG. 7;

FIG. 10 is a fragmentary cross-sectional detail view as taken on line 10—10 of FIG. 7, and more clearly showing the adjuster screw mounting provided in the actuator disc;

FIG. 11 is an elevational view on the same relative scale as FIG. 7 of an illustrative form of stator friction disc as used in the brake assembly of this invention;

FIG. 12 is an elevational view illustrative of a rotor friction disc as shown on a scale somewhat enlarged relative to the other figures;

FIG. 13 is a fragmentary edge view of a portion of the rotor disc as viewed in elevation on line 13—13 of FIG. 12;

FIG. 14 is an enlarged fragmentary cross-sectional detailed view through the rotor disc as viewed substantially on line 14—14 of FIG. 12;

FIG. 15 is an elevational detailed view on an enlarged scale, illustrative of the combined housing mounting and seal retainer plate;

FIG. 16 is a cross-sectional view as seen on line 16—16 of FIG. 15, and additionally showing compositely in exploded relationship the sealing means, a mounting bolt (depicted in dotted outline) and a bolt retainer means for the latter;

Figure 19:
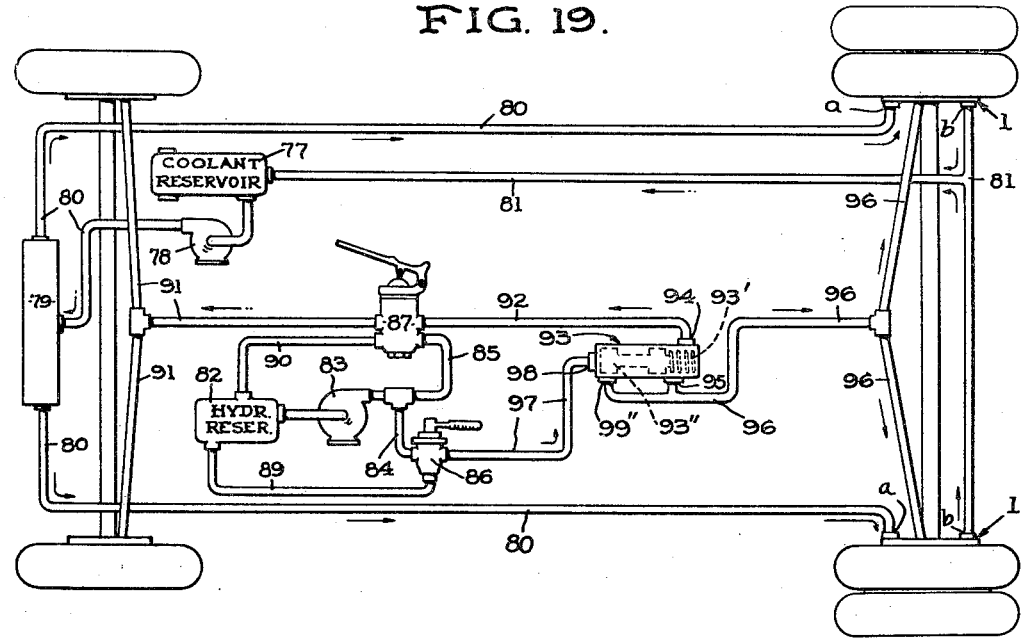
Figure 20:
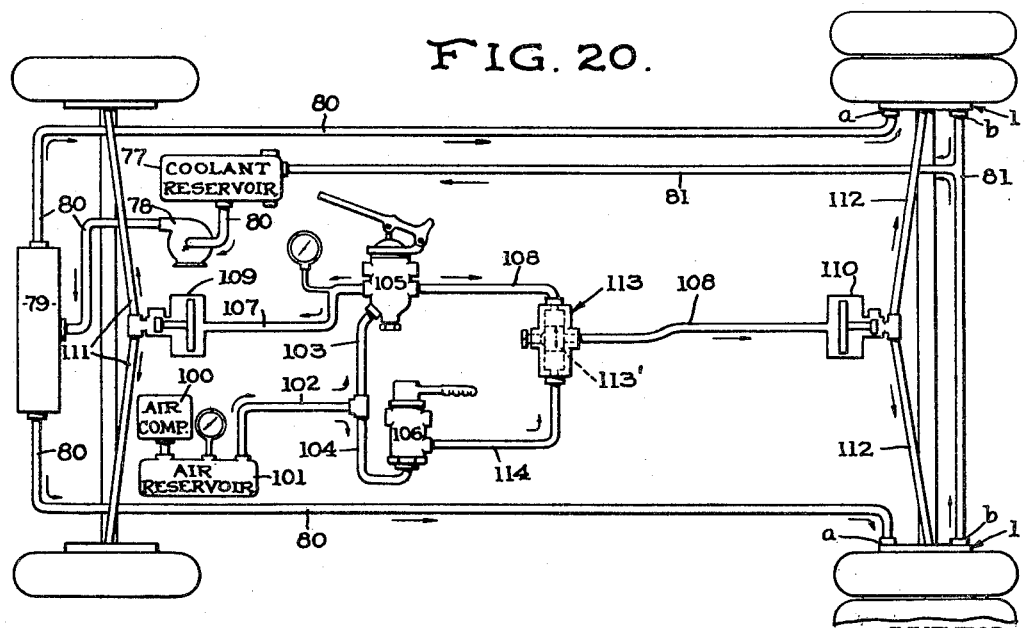

FIG. 17 is a detailed perspective view of a mounting bolt retainer;

FIG. 18 is a detailed cross-sectional view on an enlarged scale of the annular brake actuator piston, backup thrust washer and seal assembly as embraced substantially within the dotted circle of FIG. 1;

FIG. 19 is a schematic plan view of one illustrative brake system embodying combined retarder and service brakes according to my invention, and said system utilizing a central hydraulic supply and pump in combination with separate hand and foot-operated metering valves, together with a hydraulic cooling system; and FIG. 20 is a schematic plan view of an alternative "air over oil" controlled brake system and hydraulic cooling system in which my improved combined retarder and service brakes are embodied.

Like reference characters designate corresponding parts throughout the figures of the drawings, wherein for the purpose of illustrating one practical embodiment of my invention, a stationary brake housing assembly generally designated 1 is shown sealingly secured to a supporting or mounting flange 2 of the axle housing 3 for a rotary drive axle 4, as by means of bolt and nut assemblies 5. The axle 4 is shown connected in the usual manner, as by means of stud and nut assemblies 6 passing through the radially extended end flange or head 7 of the axle 4, to operatively drive a wheel hub assembly 8 which is rotatably mounted upon the axle housing 3 by means of appropriate roller bearing assemblies 9, 9 interposed therebetween. Inboard of the innermost bearing 9, there is provided an appropriate oil seal 9', which may be of conventional form, to help seal the interior of the friction device against loss of cooling fluid. The axle housing 3, drive axle 4, wheel assembly 8 and their related parts have been illustrated in broken lines as they do not constitute a part of the retarder-brake invention per se, and their details may be varied at will without affecting the retarder-brake assembly.

A rotor friction disc driver member 10, having a mounting flange 10' extending radially outward from its main cylindrical body or hub portion and having a plurality of driving splines 11 at the end of the hub opposite the mounting flange 10', is connected for rotation with the wheel hub assembly 8 by means of a plurality of bolt and nut assemblies 12. The inner periphery of flange 10' cooperatively shoulders upon the inner hub end of wheel hub assembly 8 and is provided with static sealing means 10" therebetween to preclude loss of the coolant fluid from within the brake.

The splines 11 of the driver member 10 project into the interior of a 2-part generally cylindrical stationary housing assembly 13 which comprises inboard and outboard housing members 14 and 15, respectively. The splines 11 serve to rotatably carry or drive a plurality of rotor friction discs 16, the specific details of which will be described hereinafter, said discs having complementary splined inner peripheries 17 permitting said rotor discs 16 to be freely shifted axially upon the splines 11, while precluding rotation of said discs relative to the hub of the driver 10.

The inboard and outboard housing members 14 and 15, respectively, preferably comprise generally flat annular lightweight metal plate members and are preferably provided with suitable outwardly extended projections or fins as at 18 (quadrant A—A, FIG. 2) which help supplement the primary hydraulic cooling of the brake and also serve to stiffen the plates. The inboard and outboard housing members are further provided with axially extended complementary outer flanges 19 and 20, respectively, which, when in assembled relationship, clamp an annular fluid sealing gasket 21 therebetween. This 2-part housing assembly 13 forms a strong but lightweight hollow brake shell which is held in assembly by a plurality of circumferentially spaced bolt and nut assemblies 22 which pass axially through aligned holes in the outer peripheries of the respective housing members 14 and 15 and gasket 21. A plurality of dowel pins 23, preferably press-fit and arranged equidistantly in the outboard housing member 15 toward the outer periphery thereof and which mate with holes provided in the inboard housing member 14, may be further employed to more quickly facilitate correct orientation of the two housing members during assembly, particularly in view of the provision of a plurality of stator friction disc anchor studs or pins 24 which are slip-fittingly mounted within complementary axially-extended sockets in both housing members. By utilizing a substantial number of anchor pins 24 as shown, they serve to more uniformly distribute and absorb the braking torque throughout the brake housing assembly 13, thus assuring safe heavy duty usage.

The inboard housing member 14, which also serves as a power plate, is preferably fabricated of a lightweight but very sturdy metal such as an aluminum or magnesium alloy, and securely mounts the housing assembly 13 upon the axle housing supporting flange 2 by means of the aforementioned bolt and nut assemblies 5, each of which is sealed against fluid loss by appropriate sealing means carried within a combined mounting-bolt-and-seal-retainer plate assembly. The bolt of each assembly 5 passes through aligned holes formed in the inner radially-extended peripheral flange of housing member 14, and through the flange 2 of axle housing 3. Said retainer plate assembly comprises an annular plate 25 having a plurality of circumferentially spaced beveled holes 25' (FIGS. 15 and 16), which align with the corresponding mounting holes aforesaid. Sealing means, preferably in the form of "O-ring" seals 26, are provided to seat upon the bevel edge of each hole 25' as it is assembled to the housing and axle mounting flanges by the bolt assemblies 5. In order to more readily facilitate mounting and to prevent said bolts from turning as the nuts are drawn up tight, each bolt is preferably provided with a steel bolt retainer or clip 27 (best seen in FIGS. 2, 5, 16 and 17). Each clip 27 is of generally U-shape, with a shorter leg 27' bent contiguously to the end face of the bolt head and abutting against the head of the bolt to properly hold it in its mounting position. Each of the clips 27 is secured to the plate by any suitable means such as by rivets 27". The plate 25 additionally serves as a wear plate to preclude marring, cracking or deforming of the lightweight alloy housing when the mounting bolts are drawn up securely.

Within an annular axially projecting boss formed on the inner radial wall of housing member 14, there is provided an axially extended annular actuator piston cylinder 28 disposed concentrically about the axis of the brake assembly and opening inwardly of the housing. A complementary annular actuator piston 28' is slidably disposed for axial movements within piston chamber 28 and operable against a raised annular boss 29' provided upon one side of an otherwise generally flat annular primary actuator disc 29.

Actuator disc 29 is disposed for axial movements only, by being provided with a plurality of arcuately notched keyways 30 about its outer periphery for cooperative sliding engagement on the stator disc anchor pins 24. The actuator disc 29 is provided with a flat face 31 on the side opposite the annular boss 29', and operably engages against the friction disc pack which comprises a plurality of interleaved rotor and stator discs, 16 and 31 respectively, responsive to operating pressure fluid directed into piston cylinder 28 against the piston 28'. A boss 32, formed on the inboard housing member 14, is provided with an operating fluid inlet port 33 and a bleed port 34, both of which are suitably threaded to receive a threaded conduit fitting 35 to permit entry of either a hydraulic or pneumatic operating fluid, and a standard type of bleed valve 36, respectively. Both ports 33 and 34 are interconnected by passageway 37 (FIG. 1) which in turn communicates with the piston chamber 26. The actuator disc 29 is normally biased away from or out of engagement with the disc pack by means of a plurality of return springs 38 which each engage at one end over a radially inwardly projecting finger 39 on the inner periphery of the actuator disc 29, and with the other end of the spring engaging a gasketed spring retainer pin 40 extending into the outer end of a spring mounting recess 41 formed within axially extended housing projections 42 on inboard housing member 14.

The actuator disc 29 is further provided with a plurality of self-adjuster means 43, preferably spaced at 120° intervals about the outer periphery thereof. Each adjuster means comprises a one-way shiftable multiple-lead buttress type screw 44 having a rounded lead end 44′ and an enlarged head 44″ on the opposite end. The head 44″ is provided with axially disposed serrations thereon which cooperate with spring detent means 45 carried by disc 29 and which permit rotation of the screw in only the adjusting direction. The detent means 45 comprises an angularly disposed spring pawl 46 carried on an upstanding ear 47′ of boss 47 which is formed on the actuator disc 29. Each screw 44 is rotatably mounted within a complementally threaded aperture 48 in boss 47 on the actuator disc 29, and projects axially therefrom toward each of the housing members 14 and 15.

Inboard housing member 14 is provided with deep recesses designated generally at 49, which are disposed opposite each of the adjuster means 43 near the outer periphery thereof, to accommodate the said adjuster means 43 and to provide ample room so that the lead end 44′ of each screw 44, during operation of the friction device, engages against the inward face 51′ (see FIGS. 6 and 6a) of a radially inward projecting boss 51 formed on the axially extended marginal flange 20 of outboard housing member 15. During release of the friction device, the head end 44″ of each screw 44 bears against a raised projection 50 formed within and adjacent to the deepest portion of each recess 49, thus holding the actuator disc in the new wear-takeup-adjusted position in relation to the disc pack and housing plates as effected by the rotated position of the screw 44 and by the detent means 45. Additionally, a suitable hardened steel drive stud 52, having a serrated shank and a small head against which the lead end 45 of the adjuster screw 44 bears, is driven into a suitable aperture within each boss 51 to prevent undue wear on that surface, particularly when the housings are fabricated of lightweight aluminum materials.

The actuator piston 28′ is sealed against loss of operating pressure fluid therepast by means of a novel composite sealing means designated generally at 53 (best seen in FIG. 17). Said seal comprises a first sealing member 54, which also acts as a piston back-up or thrust washer, and which is machined or molded from preferably a "Teflon"-fiberglass commercially available plastic compound into the form of a unitary integral ring having a radially extended wall 55 with inner and outer peripheral faces 56 and 57 respectively. The wall 55 is provided with one flat radial face 58, and the opposite face 59 is generally flatly cupped or channel-shaped in cross-section, as defined by a pair of annular flexible sealing lips or flanges 60, 60 which project laterally at substantially right angles from the inner and outer peripheries of the radial wall 55.

The lips 60, 60 are radially spaced from each other and have their respective inwardly opposed faces 61, 61, divergingly inclined, each face 61 being disposed approximately at an angle of 30° with respect to the peripheral faces 56 and 57 respectively.

When in assembled relationship, the flat face or side 58 of wall 55 of the sealing member 54 abuts against the rear wall of piston 28′, while the flattened cup-shaped or channel-shaped side 59 faces the inner end of the piston chamber 28. The lips 60, 60 substantially divergingly straddle the inner and outer peripheries of a second sealing member 62. The second sealing member is preferably in the form of a resilient lobed seal having a form that enables it to seat against the flat surface 61 between lips 60, 60. Thus, as operating pressure produced by the introduction of an operating fluid medium is increased within the piston cylinder or chamber 28, forcing the seal 62 against the back-up washer seal 54 and piston 28′, compressive forces on seal 62 are transmitted to the back-up washer 54, causing it to attain an extremely effective seal by forcing the inner and outer tapered lips 61, 61 into sealing engagement against the cylindrical walls of chamber 28 to take up any clearance therebetween, and thus preclude any extrusion of the other resilient sealing member 62 between the O.D. or the I.D. of washer 54. By use of this improved sealing means for the actuator piston, manufacturing production costs can be greatly reduced by eliminating otherwise necessary very close-fitting tolerances in the making of the piston 28′ and piston chamber 28. The use of a plastic "Teflon"-fiberglass material for the washer 54 affords the necessary resilience to permit proper flexing of the sealing lips 60, 60 as well as provides a material inherently having an extremely low coefficient of friction and excellent heat-resistant characteristics. Due to the latter characteristic, a thrust washer 54 fabricated from this material will also act as a heat insulater and prevent overheating of the operating fluid.

Reverting back to the outboard housing member 15, the inner periphery thereof is provided with a shouldered seat 63 which is disposed in radially spaced relation to the hub of rotor friction disc driver 10. A conventional rubber cage-type rotary fluid sealing member 64 generally similar to wheel hub seal 9′ is interposed between hub 10 and seat 63 to complete the sealing of the assembled friction device in order to preclude loss of the fluid coolant which enters and exits the sealed housing assembly 13 through preferably diametrically opposed threaded ports $a$ and $b$, respectively (see FIG. 5), as well as to serve as a dust seal to preclude entry of foreign materials into the retarder-brake assembly. At least one drain plug 65 having a seal 65′ is also preferably provided at a lowermost part of the housing, as shown in FIG. 6. Further, the end wall of housing member 15 is provided on its inside with a radially extended flat annular friction surface 66, said wall and surface acting as a back-up plate or secondary brake disc between which and the primary actuator disc 29 the friction disc pack is interengagingly interposed to effect either momentary snubbing or retarding of the brake, or a full and complete braking of the vehicle upon which the assembly is mounted.

The disc pack comprises a plurality of interleaved, axially shiftable friction rotor and stator discs, 16 and 31 respectively, as previously briefly mentioned. The stator friction discs 31 comprise annular flat discs having friction surfaces on opposite sides thereof. Said discs 31 are provided on their outer periphery with circumferentially spaced arcuately notched ears or lugs 67 which cooperatively and slidingly seat upon the correspondingly disposed anchor studs or pins 24, thereby allowing them freely axially shiftable movements while precluding any rotary movements thereof. The stator discs are also provided with slots 68 which extend openly from the outer periphery and radially inwardly toward the axis of the disc and terminate at a point inwardly beyond the mid-portion of the radial width of the disc section. Conversely, other similar slots 69 open to the inner periphery of disc 31 and are disposed in circumferentially offset relation to slots 68, preferably substantially midway between slots 68. These slots 69 terminate at a point which is a little outwardly beyond the mid-portion of the radial width of the rotor disc 31. The purpose of this is to provide an overlap of these slots as they cooperate with similarly disposed but reversely directed slots 72 provided in the rotor discs 16. These slots serve a dual function of relieving stress as well as serving as coolant passages or slotways for the coolant to pass therethrough and on through the correspondingly similar and other cooling passageways in the interleaved rotor friction discs 16, now to be described in more detail.

Referring to the enlarged detailed views, FIGS. 12, 13 and 14, each rotor disc 16 comprises a flat annular ring having a plurality of driving splines 17 as previously described, and said disc is further provided on opposite faces thereof with an annular band or disc of sintered friction lining material 70 bonded thereto. Said lining 70 is divided into a plurality of arcuate segments 71 by a plurality of circumferentially disposed radially projecting slots 72 cut completely through the lining and disc 16. The slots 72, which also serve both as stress relief and coolant flow slots, are radially outwardly open at the outer periphery of the disc 16 and extend radially inwardly toward the axis B of the disc, terminating at a point inwardly of the mid-portion of the overall radial width of the disc 16. Thus, both the slots 72 of rotor discs 16 and the slots 69 of stator discs 31 are long enough as to sufficiently overlap so that at certain times during their relative rotation through-way cooling channels, as illustratively indicated at 73 in quadrant D—D of FIG. 2, are provided to afford an easier flow of the coolant through and around the disc pack. To further facilitate the flow of coolant in and around the discs of the disc pack, the band of sintered lining material 70 is provided with a plurality of grooves 74 which define lands 75 therebetween. Said grooves 74 are disposed eccentrically to the axis B of disc 16, but concentrically to each other about the axis A which is slightly offset from axis B as clearly shown in FIG. 12 at X. The concentric grooves 74 are interrupted by the radially extended slots 72 and also by several pairs of intersecting coolant grooves indicated generally at 76 (sometimes referred to as "wagon tracking") which, together with slots 72, are desired to provide the additional coolant pathways for cooling the friction surfaces than that which grooves 74 are capable of affording alone. By disposal of the cooling grooves 74 in an eccentric relation to the axis B of the disc and to the axis of the brake assembly, it becomes readily apparent that as the rotor discs 16 rotate relative to and frictionally against the contiguous stator discs 31 during retarding and braking applications, an eccentric radial wiping action of the stator friction discs by the lands 75 takes place, whereby each land eccentrically revolves about the axis B and creates a radial wipe path, the width of which is equal to twice the eccentric offset of the two axes A and B, plus the radial width of the land doing the wiping. As a specific example, illustrative relative dimensions of one practical embodiment of a rotor disc assembly having an annular friction lining surface with an 11¾" I.D. and a 14¾" O.D., have been applied to these parts shown in FIGS. 12, 13 and 14. Thus, using these dimensions, it can be readily determined that the radial wipe path for any given land 74 will be equal to twice the .132" eccentric offset of the axes A and B plus the .044" radial width of the land, which equals a total of .308". Dividing this .308" by the pitch .066" of the lands results in a figure of 4.666, thereby indicating that the contiguous stator disc friction surface area is swept 4⅔ times outwardly and inwardly per each disc revolution. Also it is readily apparent that the sweep path of each land 74 overlaps or extends into the sweep path of the land next to it, and, depending upon the amount of eccentricity of the axis A of the concentric lands and grooves as related to the axis B of rotor disc 16 per se, the sweep path of each land will usually overlap several of the adjacent lands and their respective paths.

Among the many advantages attained by the use of this improved rotor disc assembly is a considerably more effective distribution of the coolant fluid over the friction surface of the brake, while simultaneously affording effective wiping of the surfaces without excessive scoring thereof. Any scoring is minimized by the eccentric rotation of the concentric grooves and lands, 74 and 75 respectively, which precludes wearing of grooves on the friction surfaces. Inasmuch as the coolant liquid also inherently acts as a lubricant, it has a tendency to "coat" upon the friction linings and surfaces, and by use of the above-described rotor disc assembly, the entire friction surface is wiped frequently during each revolution of each rotor disc assembly 16, and a more efficient and effective wiping is provided by the eccentric overlapping movement of the lands during their rotation. Another advantage resides in easier, less time-consuming, and less expensive machining operations required for the machining of a lining disc having a concentric groove pattern as compared with a spiral groove pattern. Accordingly, it becomes apparent that both the stator and rotor friction discs provide for much stronger and longer service, particularly under heavy duty and severe service conditions.

Furthermore, because the friction device is designed especially for heavy duty adaptations, a need for long life and rigidity in the construction thereof is essential. Therefore, among the further advantages of the friction device is the simplicity of the construction which affords economy, ease of manufacture, and a sufficient source of operating power which thereby eliminates the necessity for self-energization features and their attendant more complex construction and cost. The advantage of ease of assembly and pre-assembly becomes more apparent when one considers that the entire retarder-brake can be assembled with speed and simplicity commencing with the inner housing sub-assembly including the mounting-bolt-and-seal-retainer plate 25, the insertion of the actuator piston and its improved composite sealing means 53, the simple mounting of the actuator disc 29 which carries the self-adjuster means 43 by use of the return springs 38, the novel slip or press fit of the anchor pins 24 within the housing members, the assembly of the improved friction disc pack, in relation to the anchor pins, and the enclosure of the device by the bolting on of the outer housing member together with appropriate sealing means to assure a leak-proof assembly, all of which simply, quickly and easily attachably and detachable cooperate with the rotor disc driver 10, wheel assembly 8 and vehicle axle mounting flange 2.

A brief description of the operation of the improved retarder-brake friction device 1 per se is as follows. Hydraulic or pneumatic brake fluid is admitted under pressure from a suitable source (see illustrative systems and description of FIGS. 19 and 20) into the annular piston chamber 28 through port 33 (FIG. 4) and passageway 37 (FIG. 1), whereupon it forces the annular piston 28' axially against the primary actuator disc 29, causing it to yieldingly move axially against the multiple friction disc pack within the central part of the brake housing assembly 13. As the alternately interleaved rotor and stator discs, 16 and 31 respectively, come into contact with each other and as a pack with the back-up plate or secondary disc surface 66 of outboard housing member 15, responsive to the continued axial movement of the primary actuator disc 29, the retarding and/or braking torque imparted by the rotary friction discs 16 to the stator friction discs 31 is more uniformly and more effectively absorbed and transmitted to the housing assembly 13 by means of the plurality of anchor pins 24 disposed circumferentially all around the outer periphery of the housing. Attendant high heat resulting from repeated or prolonged retarding or braking applications is effectively and efficiently dissipated by the coolant fluid circulated into, through and out of the friction device as hereinafter described in conjunction with the systems of FIGS. 19 and 20.

Upon release of the braking fluid pressure, the component parts of the brake are urged back into their normal running clearance positions by means of the return springs 38.

The automatic wear adjuster means 43 disclosed herein are not new per se, but the recessed mounting relationship thereof with respect to the walls and flanges of the housing assembly as described in the foregoing, constitutes an improved overall combination, along with the other components such as the improved rotor disc assemblies 16, stator anchors and anchoring means 24 and improved composite actuator piston sealing means 53.

Coming now to the systems shown in FIGS. 19 and 20, both figures show the same typical and preferably hydraulic cooling systems used in conjunction with the heavy duty retarder-brake device of this invention to assure effective dissipation of the high heat content which naturally builds up therein as a result of retarding, snubbing or full braking applications of the friction device. A suitable coolant reservoir 77 is provided in association with a pump 78 of sufficient capacity to maintain the cooling system completely full and devoid of air, as well as to maintain a constant coolant circulation through a suitable external heat exchanger 79 to be mounted preferably under the hood of the vehicle upon which a system and friction device of this type is to be utilized. Arrows illustrate the flow path of the coolant as it is pumped from reservoir 77 through feed conduits or lines 80, by way of heat exchanger 79, into port $a$ of the retarder-brake assemblies 1, shown diagrammatically in conjunction with a rear dual wheel of a vehicle. The coolant absorbs the heat within the brake and flows out through return port $b$ and through lines 81 back to the reservoir, whereupon the cycle is continuously repeated.

FIG. 19, in addition to showing the cooling system above described, is also schematically illustrative of a retarder-brake operating system as powered by a central hydraulic system. In this particular system, an actuating hydraulic fluid is delivered under pressure from reservoir 82 by means of a suitable circulating pump 83, which directs the fluid through conduits 84 and 85 to the respective conventional hand and foot-operated metering control valves 86 and 87. Return by-pass lines 89 and 90 are provided from valves 86 and 87, respectively, and lead back into the reservoir 82. The foot-operated valve 87 is of conventional form and is preferably provided with at least two hydraulic outlet ports from which lines 91 and 92 lead to the brakes, line 91 dividing to operatively connect with the front wheel service brakes, and line 92 leading to a two-way hydraulic selector valve 93, which is normally biased open by spring 93' to receive pressure fluid directed thereto from the foot valve 87, through inlet port 94 and on through outlet port 95 to continue by way of line 96 which divides to direct the hydraulic pressure fluid to the improved heavy duty retarder-brake assemblies 1, 1 on the rear wheels.

The hand-operated valve 86 is intended to be used as the "retarder" control valve to effect momentary snubbing or retarding of the brakes, and is provided with an outlet port from which line 97 connects directly with inlet port 98 of the two-way selector valve 93. As operating pressure fluid is directed to the latter, it yieldably shifts piston 93" against the bias of spring 93' to close off port 95 while opening both inlet port 98 and an outlet port 99 through which pressure fluid is directed to effect operation only of the rear wheel brakes 1, 1. The operation of the wheel brake assemblies 1, 1 have already been briefly summarized hereinabove.

Referring to the alternative system of FIG. 20, it is representative of an "air-over-oil" controlled combination service brake and retarder system that utilizes conventional air-powered hydraulic master cylinders which will be referred to hereinafter as "power clusters."

This alternative system is provided with an air compressor 100 to build up operating air pressure within an air reservoir 101. Air supply line 102 leads from said reservoir 101 and divides into lines 103 and 104 to supply air under relatively low pressure to both a foot treadle-operated air-metering control valve 105 and to a hand-operated air-metering control valve 106 respectively, which like valves 86 and 87 are of conventional form and commercially available in the trade as manufactured by Wagner Electric Corporation, or any appropriate equivalent thereof.

Air supply lines 107 and 108 lead from the treadle valve 105 to operatively connect with the power clusters 109 and 110 at the front and the rear, respectively, of the vehicle where the relatively low pressure of the air is converted to a pressure many times that due to a ratio difference of the respective air and hydraulic pistons within the power clusters. Power cluster 109 is connected with the front wheel service brakes by means of lines 111, 111, while the rear power cluster 110 is connected by lines 112, 112 with the rear brakes which comprise the improved heavy duty retarder-brake assemblies 1, 1.

An air-actuated two-way selector valve 113, commonly called a "shuttle" valve, is operatively interposed in line 108 between the treadle valve 105 and the rear power cluster 110.

Air supply line 114 leads from the hand-operated valve 106 to also connect with the shuttle valve 113, but at the end opposite to the connection of line 108 from treadle valve 105.

For normal service braking, the treadle valve 105 is depressed to admit air pressure to the front power cluster 109, and by way of line 108 through the shuttle valve 113 to the rear power cluster 110, the air entering shuttle valve 113 causing piston 113' to shift to close off the port of line 114, and thus prevent any back flow of air to the hand-operated (retarder) control valve. As air enters the front and rear power clusters 109 and 110, respectively, normal service braking of both the front and rear wheel brakes is thereby effected.

For operation of the sysetem as a "retarder," the hand valve 106 is actuated to permit the air pressure to pass therethrough to the shuttle valve 113, which has its piston 113' shifted to close off the other end, and with the air passing through said shuttle valve to the rear power cluster only, to in turn effect operation of the rear wheel brakes only.

It is to be understood that if regular service braking becomes necessary or desirable while the hand-operated retarder is being used, it is only necessary to depress the treadle valve 105 in the normal manner until the air pressure passing therethrough becomes greater than that of the hand-operated valve 106, whereupon the piston 113' of the shuttle valve 113 will automatically be shifted to close off the port of line 114 from the hand-operated valve 106, thereby permitting both the front and rear power clusters to be actuated by the foot-treadle valve 105 to effect normal service braking. Suitable air pressure gauges are preferably provided in each of the main air lines, as desired.

During both service and retarding or snubbing brake operation, the main load is imposed upon the rear brakes, thus the improved heavy duty type of brakes as disclosed herein are preferably always used on the rear of the vehicle, while a lighter-duty construction, or even a conventional "drum-and-shoe" type brake may be utilized on the front wheels. However, the improved heavy duty brake assemblies may be provided both on the front and rear if desired.

From the foregoing, it will be readily apparent that the objects and advantages as related in the preamble and otherwise throughout the body of this specification, are fully attained by the unique friction device disclosed herein which operates equally well during both forward and reverse travel of the vehicle.

While the specific details have been herein shown and described, the invention is not intended to be confined or limited thereto as various changes and alterations may be

I claim:

1. In a friction device of the class described which includes a housing comprising a pair of housing members presenting a pair of radially extending axially spaced end plates and peripheral flanges extending axially from the end plates into abutting relationship, a plurality of coaxially arranged and axially spaced disc members including relatively rotatable and axially shiftable rotor and stator friction discs disposed between said end plates, an endmost friction disc disposed in contiguous relation to one of said end plates constituting a primary actuator disc shiftable axially in a first direction for energizing the friction device and axially in an opposite direction for deenergizing the friction device, and actuator means for axially shifting said actuator disc in said first direction, the combination comprising means providing said one end plate and its associated peripheral flange with a plurality of circumferentially spaced recesses adjacent the periphery of said actuator disc, each of said recesses including a portion extending from a side of said actuating disc facing in said opposite direction and into said end plate, means providing axially facing abutment surfaces on said one end plate at outer ends of said recess portions, said peripheral flange associated with the other of said end plates including abutments presenting second abutment surfaces at ends of said recesses opposite from said first mentioned abutment surfaces, and automatic adjuster means disposed in the respective recesses between the abutment surfaces at the opposite ends of the recesses, said automatic adjuster means comprising one way shiftable members carried by said primary actuator disc and movable in said opposite direction and axially projecting toward the abutment surfaces at opposite ends of the recesses, said one way shiftable members each having a first bearing end disposed for operative engagement with one of said second mentioned abutment surfaces and an opposite end portion extending into said portion of an associated recess for engagement with one of said first mentioned abutment surfaces, and cooperable means on said opposite end portions of said shiftable members and extending from said actuator disc into said portions of said recesses for locking said shiftable members against reverse movement.

2. A device, as defined in claim 1, wherein said cooperable means comprises an enlargement on said members having peripheral serrations thereon, and spring detent means carried by said actuator disc.

3. A device, as defined in claim 1, wherein said bearing end of each of said shiftable members is generally pointed for promoting point contact with a cooperable abutment surface, said peripheral flange having said second mentioned abutment surfaces including aperture means therein, and drive studs secured within said apertures and including hardened elements presenting said second mentioned abutment surfaces.

References Cited in the file of this patent

UNITED STATES PATENTS

| | | |
|---|---|---|
| 2,778,452 | Dasse | Jan. 22, 1957 |
| 2,889,894 | Lucker et al. | June 9, 1959 |
| 2,928,504 | Hahn et al. | Mar. 15, 1960 |
| 2,940,549 | Hause et al. | June 14, 1960 |
| 2,971,612 | Graber | Feb. 14, 1961 |